US009001444B1

(12) United States Patent
Contreras et al.

(10) Patent No.: US 9,001,444 B1
(45) Date of Patent: Apr. 7, 2015

(54) IMPLEMENTING SPIN TORQUE OSCILLATOR POWER-ON OSCILLATION CHECKER FOR MICROWAVE-ASSISTED MAGNETIC RECORDING HARD DISK DRIVES

(71) Applicant: HGST Netherlands B.V., Amsterdam (NL)

(72) Inventors: John Contreras, Palo Alto, CA (US); Samir Y. Garzon, San Jose, CA (US); Rehan Ahmed Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/316,732

(22) Filed: Jun. 26, 2014

(51) Int. Cl.
G11B 27/36 (2006.01)
G11B 5/127 (2006.01)

(52) U.S. Cl.
CPC ...................................... G11B 5/127 (2013.01)

(58) Field of Classification Search
None
See application file for complete search history.

(56) References Cited

U.S. PATENT DOCUMENTS

| | | | |
|---|---|---|---|
| 7,791,829 B2 | 9/2010 | Takeo et al. | |
| 7,982,996 B2 | 7/2011 | Smith et al. | |
| 8,027,118 B2 | 9/2011 | Ezawa et al. | |
| 8,174,798 B2 | 5/2012 | Nagasawa et al. | |
| 8,233,230 B2 | 7/2012 | Yano et al. | |
| 8,238,060 B2 | 8/2012 | Yamada et al. | |
| 8,345,380 B2 | 1/2013 | Sata et al. | |
| 8,810,954 B1* | 8/2014 | Taguchi et al. | 360/55 |
| 2009/0059417 A1* | 3/2009 | Takeo et al. | 360/75 |
| 2010/0134922 A1 | 6/2010 | Yamada et al. | |
| 2010/0232053 A1* | 9/2010 | Yano et al. | 360/75 |
| 2011/0038081 A1* | 2/2011 | Contreras et al. | 360/125.03 |
| 2012/0002325 A1* | 1/2012 | Oikawa et al. | 360/110 |
| 2012/0134046 A1 | 5/2012 | Matsumoto et al. | |
| 2013/0050865 A1* | 2/2013 | Katada et al. | 360/31 |
| 2013/0050869 A1 | 2/2013 | Nagasaka et al. | |
| 2013/0069626 A1 | 3/2013 | Zhou et al. | |
| 2013/0148234 A1 | 6/2013 | Morinaga et al. | |
| 2013/0229895 A1 | 9/2013 | Shiroishi et al. | |
| 2014/0063648 A1* | 3/2014 | Shiroishi et al. | 360/75 |
| 2014/0118861 A1* | 5/2014 | Funayama | 360/119.02 |

OTHER PUBLICATIONS

Sato et al., "Thin Spin-torque Oscillator With High AC-Field for High Density Microwave-Assisted Magnetic Recording" Jul. 2013 http://ieeexplore.ieee.org/xpl/articleDetails.jsp?tp=&arnumber=6559154.
Watanabe et al., "Oscillation Stability of a Small Size Spin Torque Oscillator for MAMR", Jul. 2013 http://ieeexplore.ieee.org/xpl/articleDetails.jsp?tp=&arnumber=6558956.

* cited by examiner

*Primary Examiner* — Thang Tran
(74) *Attorney, Agent, or Firm* — Joan Pennington

(57) ABSTRACT

A method, apparatus, and system are provided for implementing a power-on spin-torque oscillator (STO) oscillation checker to monitor STO resistance to identify STO oscillation with microwave assisted magnetic recording (MAMR) hard disk drives (HDDs). An amplitude modulated write coil drive current is applied to the write coil in the presence of a DC bias current applied to the STO. The amplitude modulated write coil drive current modulates the STO resistance monitored using an amplifier circuit to identify STO oscillation, used to ensure stable MAMR HDD write operation.

17 Claims, 10 Drawing Sheets

IMPLEMENTING SPIN TORQUE OSCILLATOR POWER-ON OSCILLATION CHECKER FOR MICROWAVE-ASSISTED MAGNETIC RECORDING HARD DISK DRIVES

RELATED APPLICATION

A related application by the present assignee and inventors John Contreras, Samir Y. Garzon, Ikuya Tagawa, and Rehan Ahmed Zakai is being filed on the same day herewith having Ser. No. 14/316,628, and entitled "IMPLEMENTING SPIN TORQUE OSCILLATOR POWER-ON OSCILLATION CHECKER USING RAMPED STO BIAS DIFFERENTIATOR IN MICROWAVE-ASSISTED MAGNETIC RECORDING (MAMR) HARD DISK DRIVES" (H20131099US1).

FIELD OF THE INVENTION

The present invention relates generally to the data storage field, and more particularly, relates to a method, apparatus, and system for implementing a spin-torque oscillator (STO) power-on oscillation checker using an amplifier circuit to monitor STO resistance with write current amplitude modulation to identify STO oscillation with microwave assisted magnetic recording (MAMR) hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

Microwave assisted magnetic recording (MAMR) heads in hard disk drives (HDDs) include spin-torque oscillator (STO) sensors. MAMR hard disk drives provide improved areal density and/or improve data error rates by producing a more precisely defined magnetic foot print, which is produced by the write head. This is accomplished by adding a source of microwave radiation near the write head. This microwave oscillator produces a magnetic field in multi-Giga Hertz frequency range. One key issue in MAMR systems is to insure that the STO is oscillating. Without oscillation, assist effect will be absent and the magnetic field foot print and thus recording quality will suffer.

A need exists for effective mechanism for implementing a spin-torque oscillator (STO) checker to monitor STO resistance to identify STO oscillation. It is desirable to provide such a mechanism with simple to implement circuit technique amenable to present preamp and front-end technologies for detecting the STO oscillation.

SUMMARY OF THE INVENTION

Aspects of the preferred embodiments are to provide a method, apparatus, and system for implementing a spin-torque oscillator (STO) checker to monitor STO resistance to identify STO oscillation. Other important aspects of the preferred embodiments are to provide such method, apparatus, and system substantially without negative effect and to overcome some of the disadvantages of prior art arrangements.

In brief, a method, apparatus, and system are provided for implementing a spin-torque oscillator (STO) oscillation checker to monitor STO resistance to identify STO oscillation with microwave assisted magnetic recording (MAMR) hard disk drives (HDDs). An amplitude modulated write coil drive current is applied to the write coil in the presence of a DC bias current applied to the STO. The amplitude modulated write coil drive current modulates the STO resistance monitored using an amplifier circuit to identify STO oscillation, used to ensure stable MAMR HDD write operation.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system are provided for implementing a spin-torque oscillator (STO) checker to monitor STO resistance modulation due to STO oscillation and ensure stable write operation for microwave assisted magnetic recording (MAMR) hard disk drives (HDDs).

Figure 1:
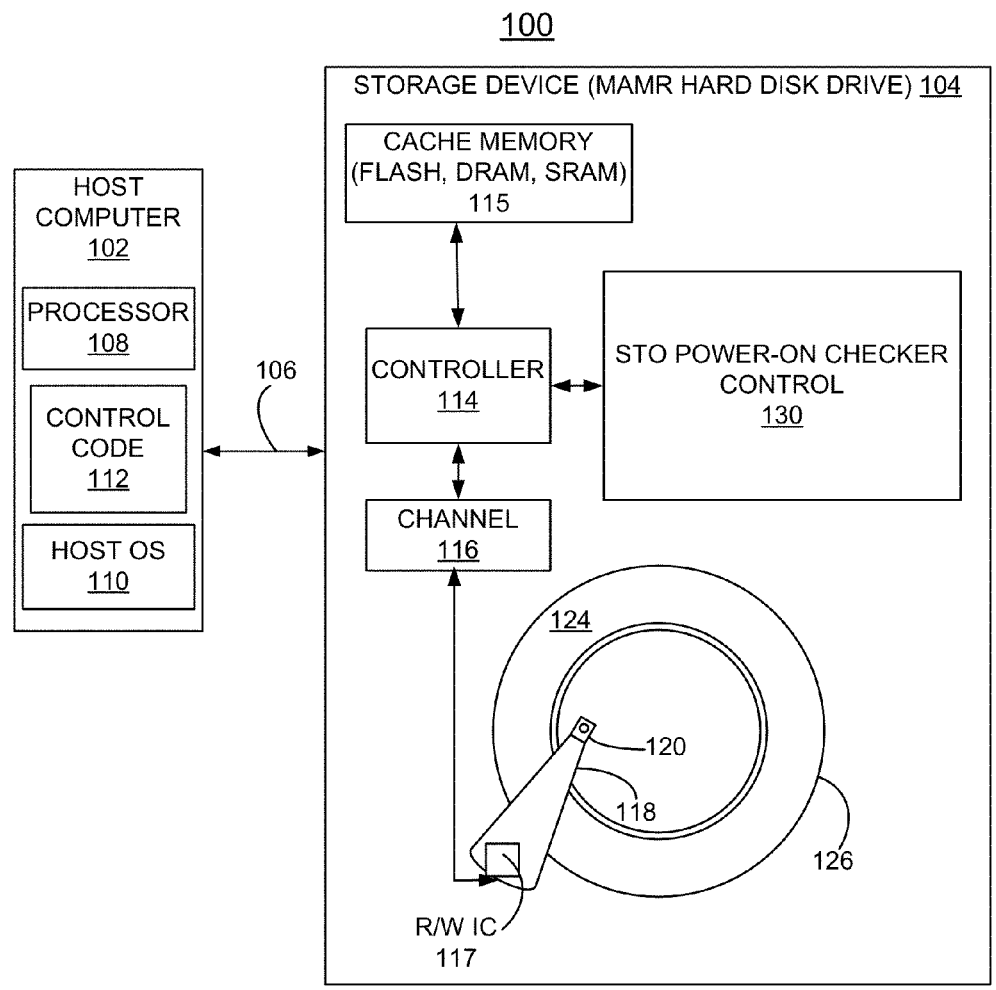
FIG. 1 is a block diagram representation illustrating a system for implementing a spin-torque oscillator (STO) oscillation checker to monitor STO resistance to identify STO oscillation with microwave assisted magnetic recording (MAMR) hard disk drives (HDDs) in accordance with preferred embodiments.

Having reference now to the drawings, in FIG. 1, there is shown an example system generally designated by the reference character 100 for implementing a spin-torque oscillator (STO) power-on checker to monitor STO resistance and provide stable STO oscillation for operation microwave assisted magnetic recording (MAMR) hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or microwave assisted magnetic recording (MAMR) hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing a spin-torque oscillator (STO) oscillation checker to monitor STO resistance at power-on and provide stable STO oscillation. The storage device or hard disk drive 104 includes an arm 118 carrying a slider 120 for in accordance with preferred embodiments. The slider 120 flies over a writable disk surface 124 of a disk 126 and includes at least one STO for microwave assisted magnetic recording (MAMR), for example, integrated with the slider 120.

In accordance with features of preferred embodiments, a spin-torque oscillator (STO) oscillation checker control 130 is provided with the controller 114 to control checking STO oscillation, for example, at power-up and periodically during operation of the MAMR HDD 104, to identify STO oscillation. The STO oscillation checking procedure can be performed periodically when the head is not flying or by moving the head to a reserved zone without customer data where the writer can be safely turned on.

System 100 including the host computer 102 and the MAMR HDD 104 is shown in simplified form sufficient for understanding the present embodiments. The illustrated host computer 102 together with the storage device or HDD 104 is not intended to imply architectural or functional limitations. The present invention can be used with various hardware implementations and systems and various other internal hardware devices.

In accordance with features of preferred embodiments, a spin-torque oscillator (STO) oscillation checker is provided to identify STO oscillation, used to ensure stable MAMR HDD write operation. Without STO oscillation, assist effect will be absent and the magnetic field foot print and thus recording quality will suffer.

Figure 2:
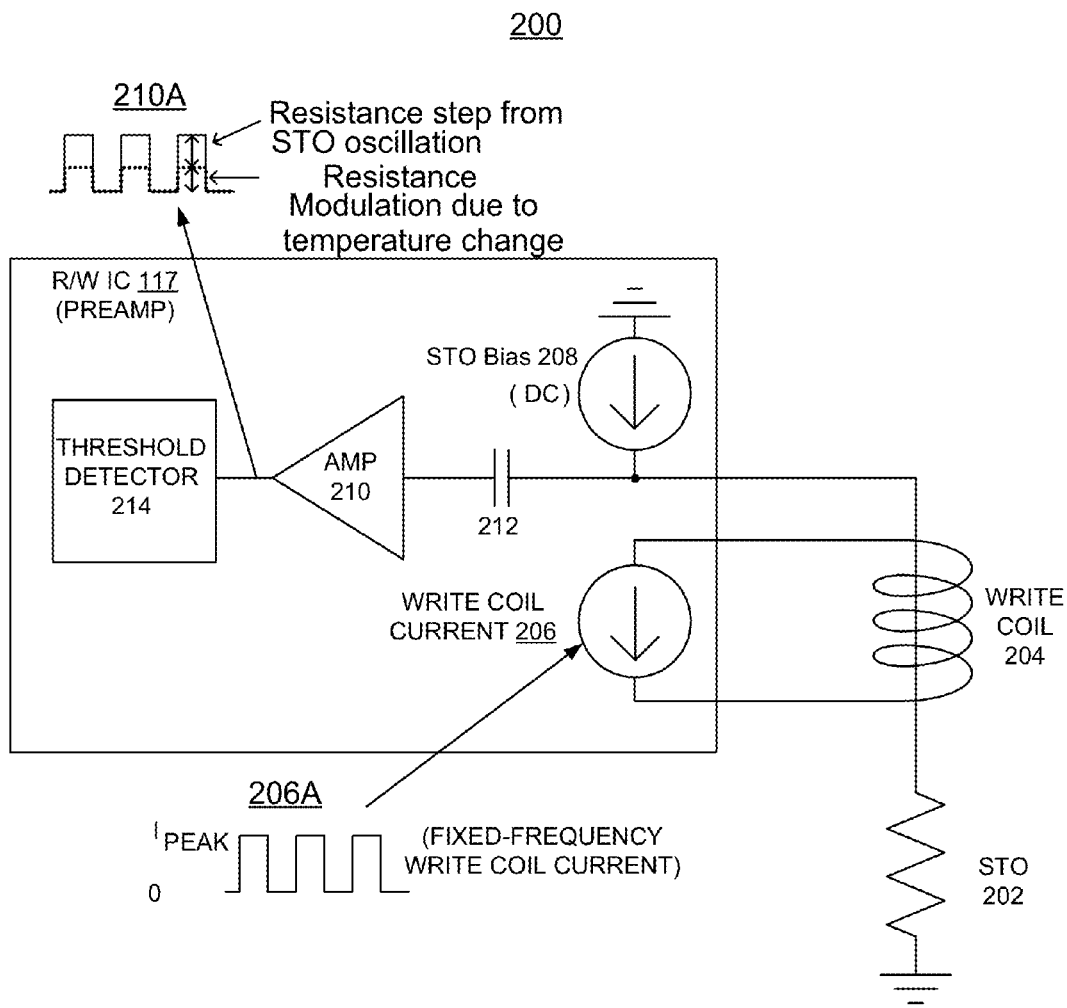
FIGS. 2, 3 and 4 schematically illustrates respective example circuits for implementing a spin-torque oscillator (STO) oscillation checker to monitor STO resistance to identify STO oscillation with microwave assisted magnetic recording (MAMR) hard disk drives (HDDs) in accordance with preferred embodiments.

Referring now FIG. 2, there is shown an example spin-torque oscillator (STO) oscillation checker circuit generally designated by the reference character 200 for implementing a STO oscillation checker and each provided, for example, in the Read/Write (R/W) integrated circuit (IC) 117 or preamplifier 117. Spin-torque oscillator (STO) oscillation checker 200 effectively determines whether a spin-torque oscillator (STO) 202 is oscillating. Spin-torque oscillator (STO) oscillation checker 200 exploits the STO resistance dependence on write coil current amplitude in order to determine if the STO is oscillating. Operation of the Spin-torque oscillator (STO) oscillation checker 200 advantageously is performed at power-on and periodically during operation of MAMR HDD 104 to identify STO oscillation.

As shown in FIG. 2, the STO 202 is provided with a write coil 204. STO oscillation checker 200 includes a write coil current source 206 connected to the write coil 204. STO oscillation checker 200 includes a constant STO bias DC current source 208 connected to the STO 202 and to an amplifier 210 via a capacitor 212 used to sense STO resistance modulation. The write coil current source 206 applies a pulsed write current to the write coil 204 while a constant DC bias current is applied to the STO 202 by the current source 208. STO oscillation checker 200 includes a threshold detector 214 connected to an output of the amplifier 210 used to sense an STO resistance modulation.

Figure 6:
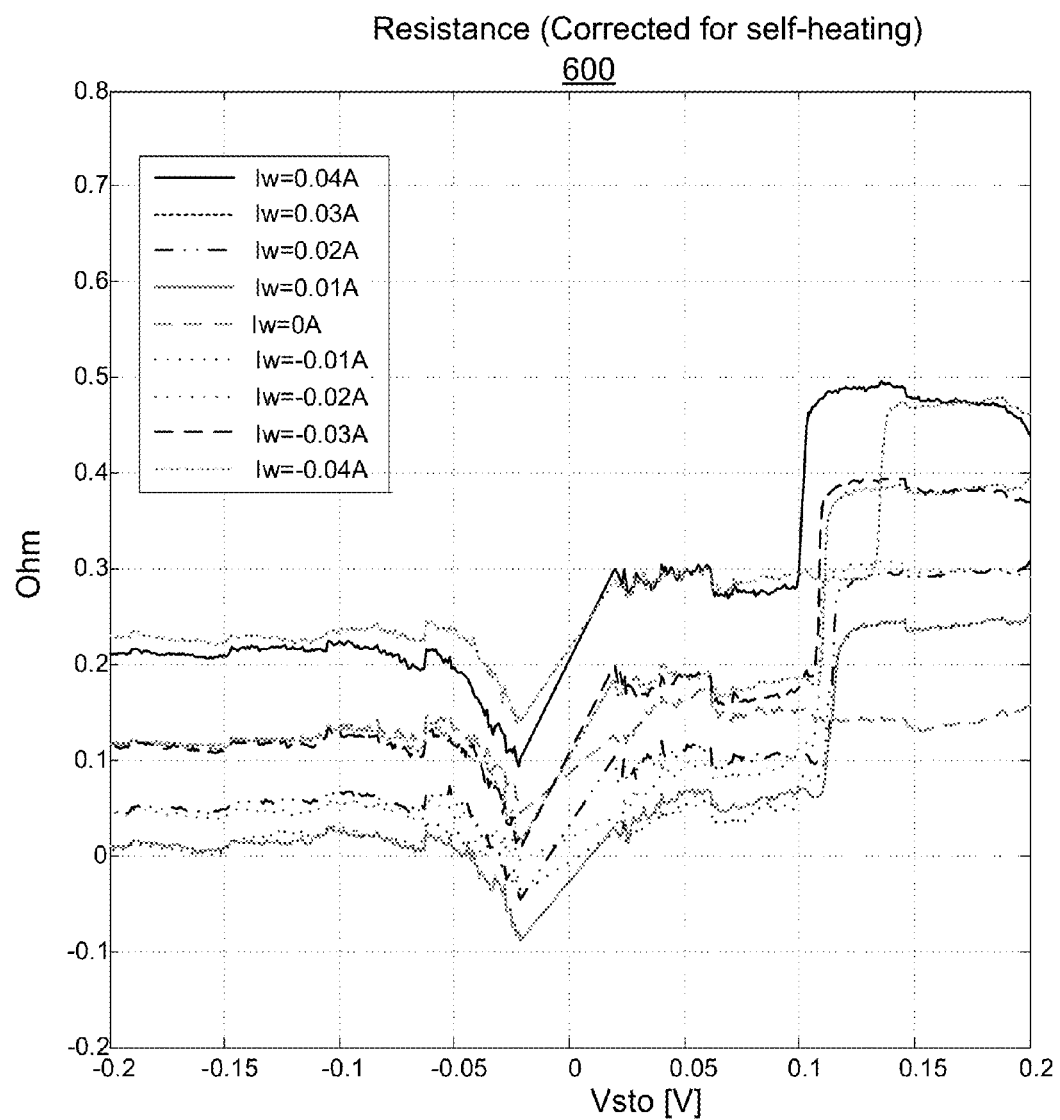

In accordance with features of the preferred embodiments, a DC bias current above the STO oscillation threshold is applied to the STO 202, such as illustrated in the step function in STO resistance when STO oscillation starts around 100 mV in the range of 0.2 ohms in FIG. 6. Write coil current as indicated by waveform 206A, is pulsed between some peak value $I_{PEAK}$ and zero. A constant or fixed pulse frequency illustrated by the write coil current waveform 206A is selected such that it not too low to make the detection time long and not too high to cause attenuation of the resistance step. Write current amplitude modulates the STO resistance and produces a pulsed waveform at amplifier output of amplifier 210, as indicated by waveform 210A.

In accordance with features of the preferred embodiments, Amplitude Modulation (AM) of the write current applied by write coil current source 206 advantageously is performed at power-on and periodically during operation of MAMR HDD 104 to identify STO oscillation.

One problem with STO oscillation checker 200 is that due to asymmetric excitation of the write coil, the STO 202 experiences a thermal modulation which also results is STO resistance modulation. This thermal modulation indicated by waveform 210A is indistinguishable from STO resistance modulation due to oscillation and therefore corrupts the signal. Using differential architecture in the STO oscillation checker 200 could eliminate the error due to thermal modulation; however, the differential architecture could require two STOs, one oscillating other not oscillating; or with a single STO, taking a measurement with the STO ON, and taking another measurement with the STO OFF, subtracting these two results to remove the effect of temperature. While using the single STO is much simpler than having two STOs, this method would take longer.

Figure 3:
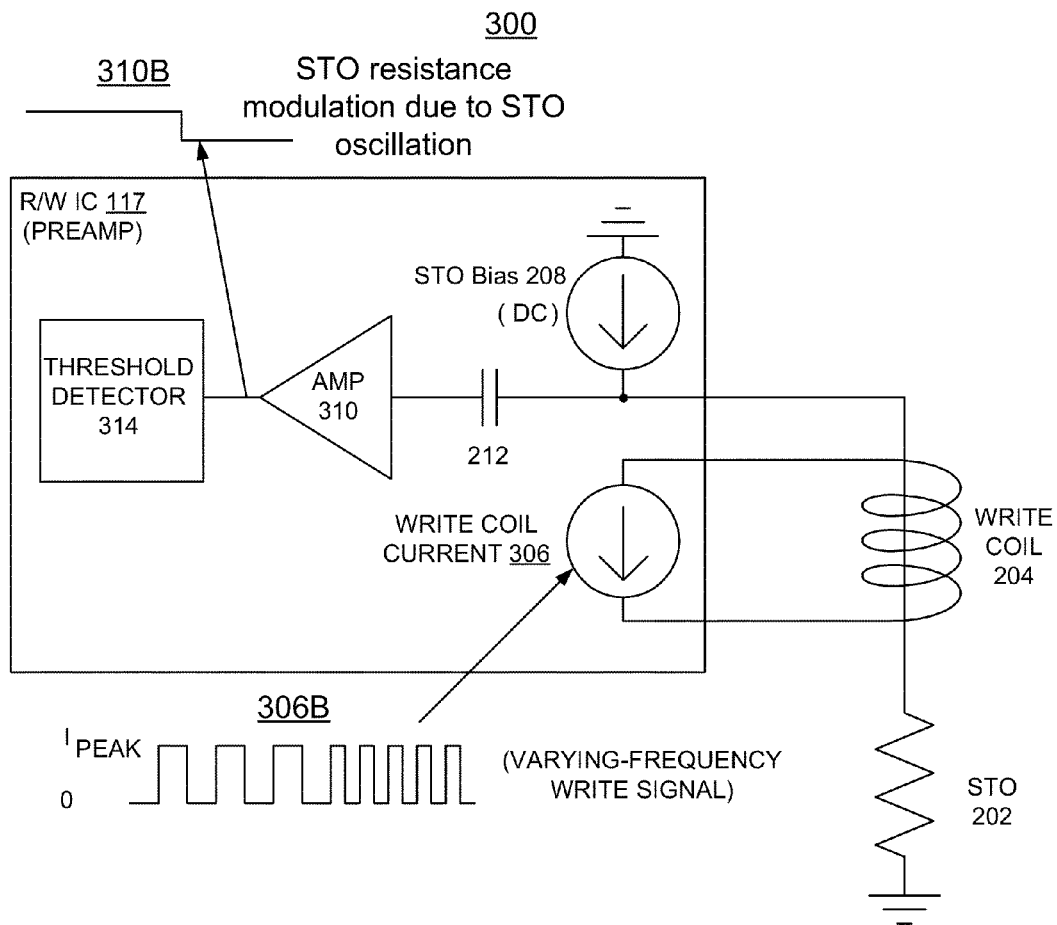

In accordance with features of the preferred embodiments, a further improved STO oscillation checker is provided, for example, as illustrated and described with respect to FIG. 3.

Referring now FIG. 3, there is shown another example spin-torque oscillator (STO) oscillation checker circuit generally designated by the reference character 300 for implementing a STO oscillation checker. In FIG. 3, identical reference numbers are used in spin-torque oscillator (STO) oscillation checker 300 for identical or substantially similar components of STO oscillation checker 200.

Spin-torque oscillator (STO) oscillation checker 300 exploits the STO resistance dependence on write coil current amplitude where observed resistance step diminishes with write coil current frequency in order to determine if the STO is oscillating. Spin-torque oscillator (STO) oscillation checker 300 effectively determines whether a spin-torque oscillator (STO) 202 is oscillating and does not suffer from thermal modulation while requiring only single ended architecture. Operation of the Spin-torque oscillator (STO) oscillation checker 300 advantageously is performed at power-on and periodically during operation of MAMR HDD 104 to identify STO oscillation.

STO oscillation checker 300 includes a write coil current source 306 connected to the write coil 204. The write coil current source 306 applies a write coil current to the write coil 204 that is pulsed with a fixed amplitude but alternating frequency while a constant STO bias DC current source 208 connected to the STO 202 applies constant STO bias DC current to the STO 202. Write coil current as indicated by waveform 306B, is pulsed between some peak value $I_{PEAK}$ and zero. An alternating pulse frequency illustrated by the write coil current waveform 306B including a sudden change in write coil current signal frequency allows for symmetric excitation of the write coil 204.

In accordance with features of the preferred embodiments, two applied write coil current alternating frequencies illustrated by the write coil current waveform 306B are far apart for producing a large modulated signal amplitude. Small frequency separation of the write coil current alternating frequencies would produce a smaller signal which would be harder to detect. An amplifier 310 and threshold detector 314 sense an abrupt resistance step of STO resistance modulation due to STO oscillation as indicated by waveform 310B provided at the output of the amplifier 310.

Figure 4:
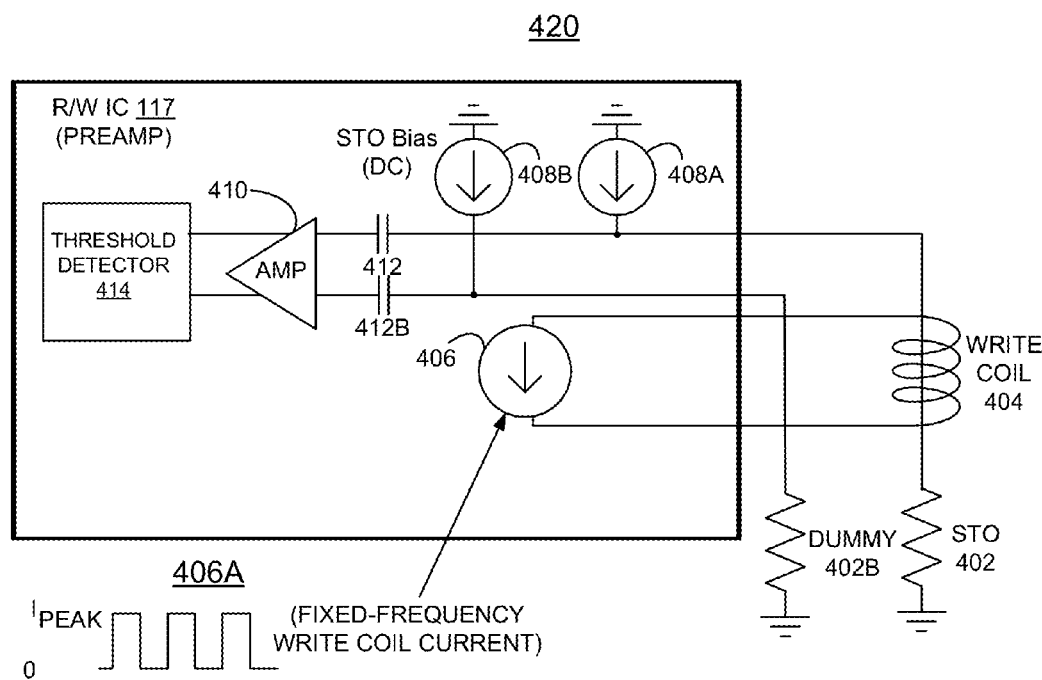

Referring now FIG. 4, there is shown another example spin-torque oscillator (STO) oscillation checker circuit generally designated by the reference character 420 for implementing a STO oscillation checker and each provided, for example, in the Read/Write (R/W) integrated circuit (IC) 117 or preamplifier 117. Spin-torque oscillator (STO) oscillation checker 420 effectively determines whether a spin-torque oscillator (STO) 404 is oscillating. Spin-torque oscillator (STO) oscillation checker 420 exploits the STO resistance dependence on write coil current amplitude in order to determine if the STO is oscillating. Operation of the Spin-torque oscillator (STO) oscillation checker 420 advantageously is performed at power-on and periodically during operation of MAMR HDD 104 to identify STO oscillation.

As shown in FIG. 4, the STO 402 and a dummy STO 402B is provided with a write coil 404. STO oscillation checker 420 includes a write coil current source 406 connected to the write coil 404. STO oscillation checker 420 includes a respective constant STO bias DC current source 408A, 408B connected to the STO 402 and dummy STO 402B and to respective inputs of differential amplifier 410 via a respective capacitor 412, 412B used to sense STO resistance modulation. The write coil current source 406 applies a pulsed write current to the write coil 404 while a constant DC bias current is applied to the STO 402 and dummy STO 402B by the respective constant STO bias DC current source 408A, 408B. STO oscillation checker 420 includes a threshold detector 414 connected to an output of the differential amplifier 410 used to sense an STO resistance modulation.

Write coil current as indicated by waveform 406A, is pulsed between some peak value $I_{PEAK}$ and zero. A constant or fixed pulse frequency illustrated by the write coil current waveform 406A is selected such that it not too low to make the detection time long and not too high to cause attenuation of the resistance step.

Figure 5:
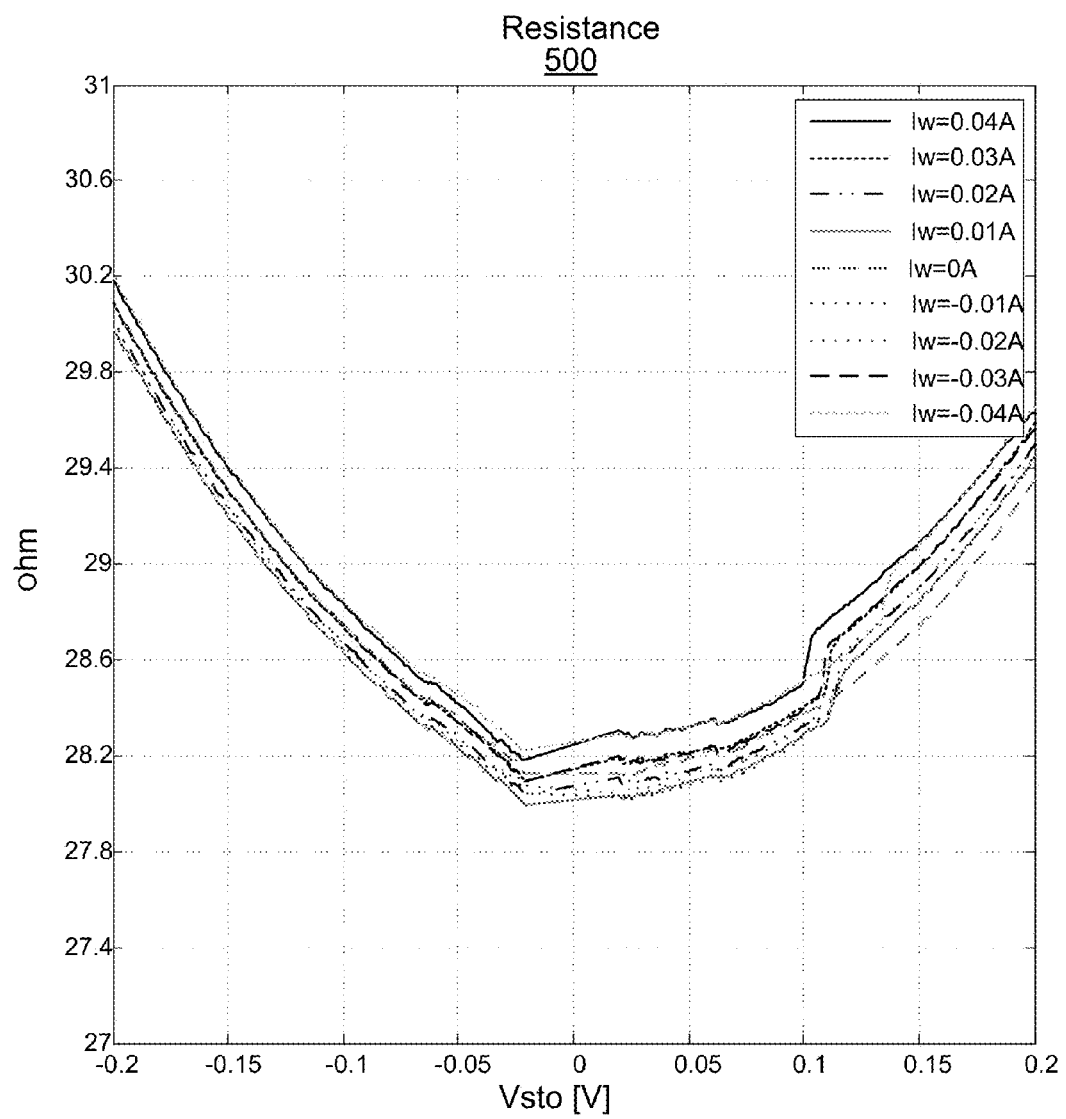
FIGS. 5 and 6 respectively illustrate example waveforms of respective example STO resistance step for positive and negative test DC write currents ($I_W$) in the accordance with preferred embodiments.

Referring to FIGS. 5 and 6 there are shown typical example waveforms respectively generally designated by the reference characters 500, 600 of respective example STO resistance step for multiple example positive and negative DC write currents ($I_W$). STO resistance step is not observed for zero DC $I_W$. In FIGS. 5 and 6 resistance in ohms is shown with respect to the vertical axis and voltage STO in volts is shown with respect to the horizontal axis.

In FIG. 6, the illustrated resistance waveforms 600 are corrected for self-healing. For example, in FIG. 6, a slight step function in STO resistance occurs when the STO 202 starts oscillating around 100 mV in the range of 0.2 ohms.

Figure 7:
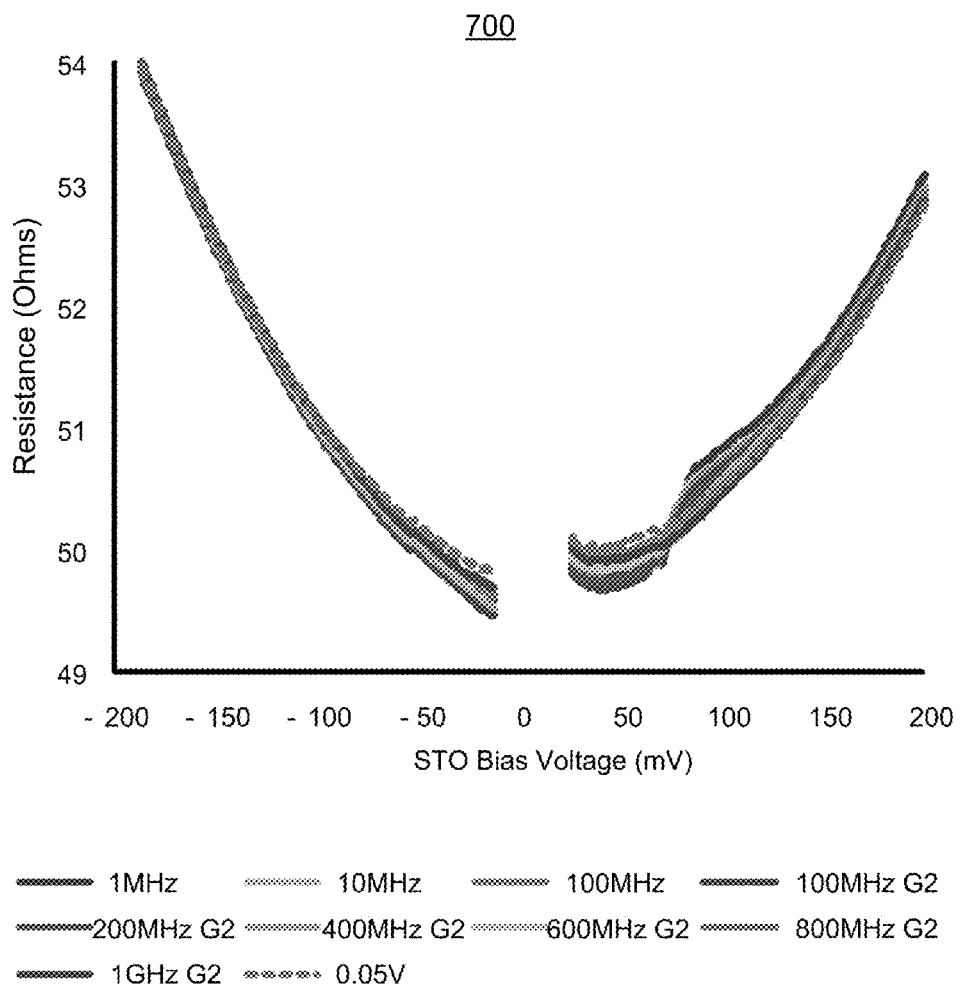
FIGS. 7 and 8 respectively illustrate example waveforms of respective example STO resistance step for test AC write currents ($I_W$) in the accordance with preferred embodiments.
Figure 8:
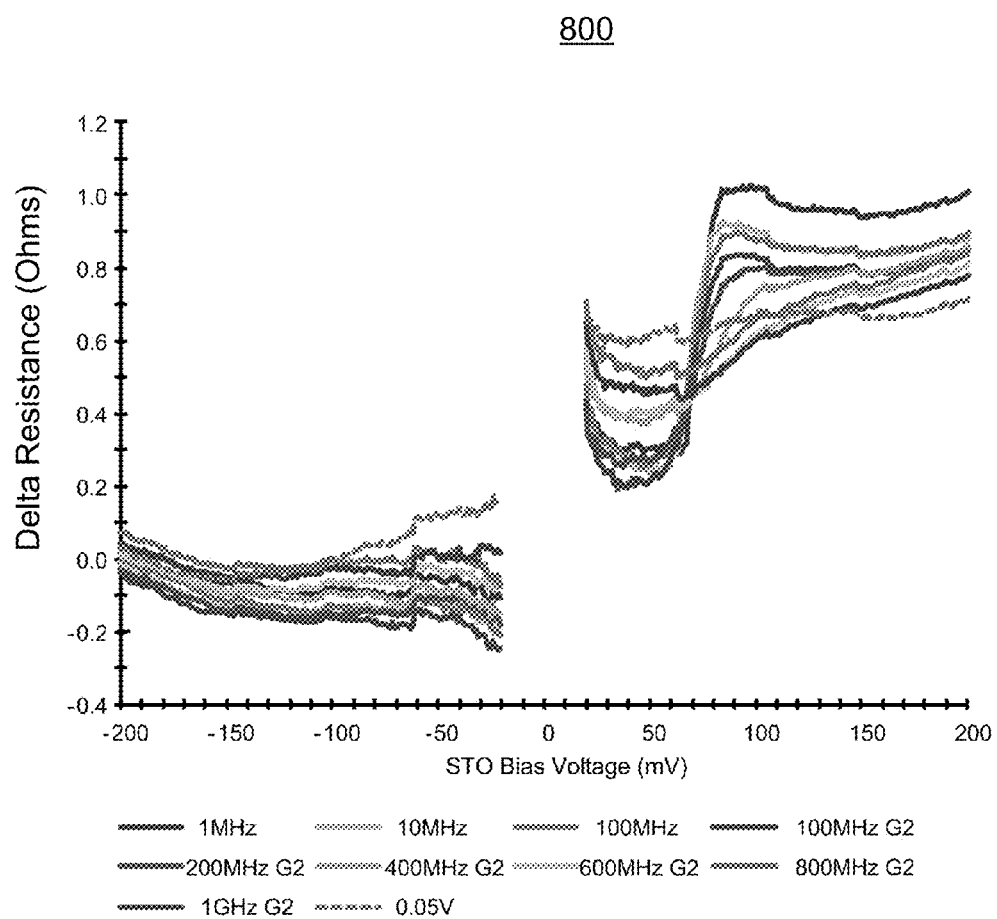

Referring also to FIGS. 7 and 8, there are shown example waveforms of respective example STO resistance step for AC current ($I_W$) respectively generally designated by the reference characters 700, 800 in the accordance with preferred embodiments. In FIGS. 7 and 8 resistance and delta resistance change respectively in ohms is shown with respect to the vertical axis and voltage STO in millivolts (mV) is shown with respect to the horizontal axis. STO resistance step for AC current ($I_W$) in the accordance with preferred embodiments is observed at low AC $I_W$ frequencies. At higher frequencies, for example 200 MHz and beyond, observed STO resistance step diminishes. For example, in FIG. 8, a large step function in STO resistance occurs when the STO 202 starts oscillating around 70 mV in the range of 0.6 to 0.8 ohms.

Figure 9:
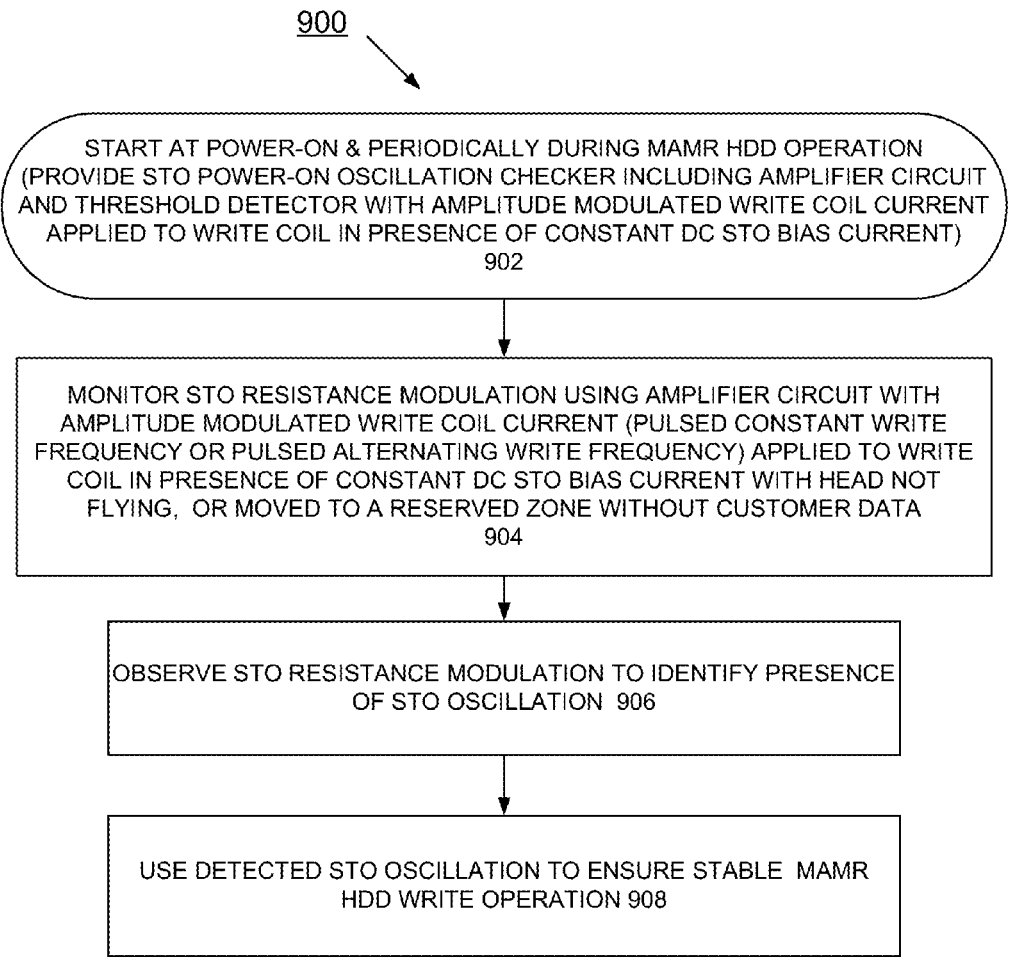
FIG. 9 is a flow chart illustrating example operations for implementing a spin-torque oscillator (STO) checker to monitor STO resistance and identify STO oscillation in MAMR HDDs in accordance with preferred embodiments.

Referring now to FIG. 9, there are shown example operations generally designated by the reference character 900 of the respective spin-torque oscillator (STO) oscillation checker 200, 300 including an amplifier circuit and threshold detector to monitor STO resistance modulation with amplitude modulated write coil current applied to the write coil in the presence of constant DC STO bias current and provide stable STO oscillation with microwave assisted magnetic recording (MAMR) hard disk drives (HDDs) in the accordance with preferred embodiments starting at power-on and periodically during MAMR HDD operation at a block 902. As indicated in a block 904, STO resistance is monitored using the amplifier circuit and threshold detector operation with amplitude modulated write coil current applied to the write coil, with a constant DC STO bias current applied to the STO during this operation. The STO oscillation checking at block 904 can be performed when the head is not flying or by moving the head to a reserved zone without customer data where the writer can be safely turned on. The amplitude modulated write coil current is applied to the write coil to observe STO resistance modulation, as indicated in a block 906, and identify presence of STO oscillation. As indicated in a block 908, the detected STO oscillation is used to ensure stable write operation of the MAMR HDD 104.

Figure 10:
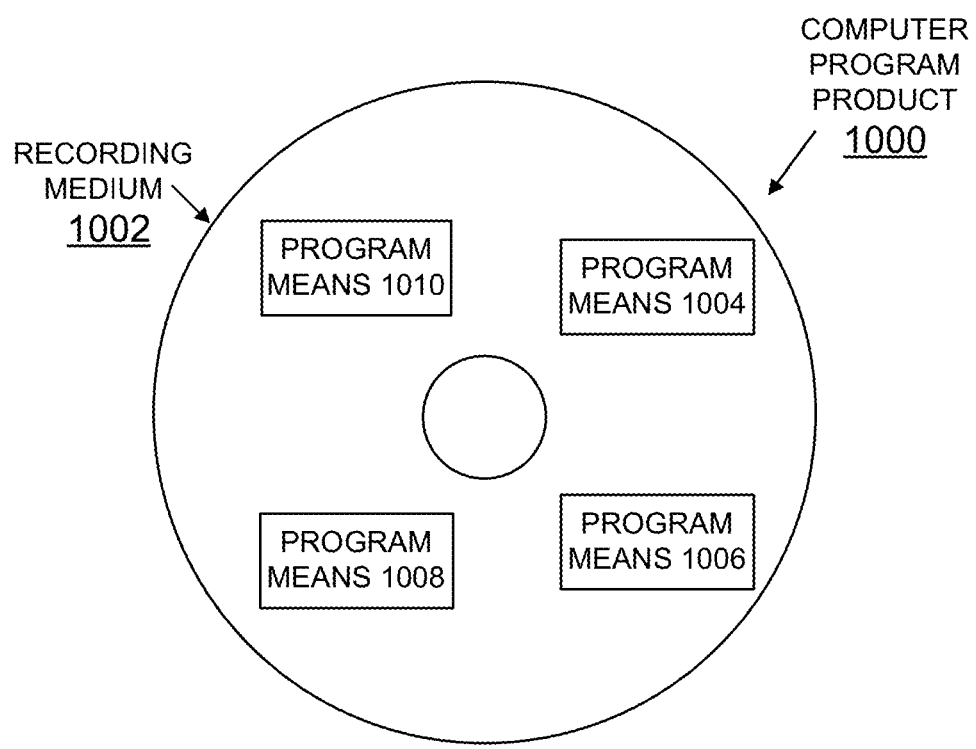
FIG. 10 is a block diagram illustrating a computer program product in accordance with preferred embodiments.

Referring now to FIG. 10, an article of manufacture or a computer program product 1000 of the preferred embodiments is illustrated. The computer program product 1000 includes a computer readable recording medium 1002, such as, a floppy disk, a high capacity read only memory in the form of an optically read compact disk or CD-ROM, a tape, or another similar computer program product. Computer readable recording medium 1002 stores program means or control code 1004, 1006, 1008, 1010 on the medium 1002 for carrying out the methods for implementing spin-torque oscillator (STO) oscillation checker for MAMR hard disk drives in accordance with preferred embodiments in the system 100 of FIG. 1.

A sequence of program instructions or a logical assembly of one or more interrelated modules defined by the recorded program means or control code 1004, 1006, 1008, 1010, direct HDD controller 114 using respective spin-torque oscillator (STO) oscillation checker 200, 300, 420 of the system 100 to monitor STO resistance modulation and ensure stable STO oscillation during MAMR HDD operation of preferred embodiments.

While the present invention has been described with reference to the details of the embodiments of the invention shown in the drawing, these details are not intended to limit the scope of the invention as claimed in the appended claims.

What is claimed is:

1. A method for implementing a spin-torque oscillator (STO) oscillation checker for microwave assisted magnetic recording (MAMR) hard disk drives (HDDs) comprising:
applying an amplitude modulated write coil current to a write coil coupled to a spin-torque oscillator (STO) at power-on and periodically during MAMR HDD operation;
using an amplifier circuit coupled to the STO, monitoring STO voltage responsive to the applied amplitude modulated write coil current to identify STO resistance modulation;
using said identified STO resistance modulation to identify STO oscillation; and
using the identified STO oscillation to ensure stable MAMR HDD write operation.

2. The method as recited in claim 1 wherein applying an amplitude modulated write coil current to the write coil coupled to the spin-torque oscillator (STO) includes applying a pulsed constant frequency write coil current to the write coil coupled to the spin-torque oscillator (STO).

3. The method as recited in claim 1 wherein applying an amplitude modulated write coil current to the write coil coupled to the spin-torque oscillator (STO) includes applying a pulsed fixed amplitude alternating frequency write coil current to the write coil coupled to the spin-torque oscillator (STO).

4. The method as recited in claim 1 includes applying a constant direct current (DC) bias current to the spin-torque oscillator (STO).

5. The method as recited in claim 1 wherein using the amplifier circuit coupled to the STO, monitoring STO voltage responsive to the applied amplitude modulated write coil current to identify STO resistance modulation includes providing a threshold detector coupled to an output of the amplifier circuit.

6. An apparatus for implementing a spin-torque oscillator (STO) oscillation checker for microwave assisted magnetic recording (MAMR) hard disk drive (HDDs), comprising:
a controller;
at least one disk; said disk including a disk media for storing data;
a spin-torque oscillator (STO) for microwave assisted magnetic recording (MAMR);
a write coil coupled to said spin-torque oscillator (STO);
the spin-torque oscillator (STO) oscillation checker comprising
a current source applying an amplitude modulated write coil current to the write coil coupled to a spin-torque oscillator (STO) at power-on and periodically during MAMR HDD operation;
an amplifier circuit coupled to the STO, monitoring STO voltage responsive to the applied amplitude modulated write coil current to identify STO resistance modulation, and using said identified STO resistance modulation to identify STO oscillation; and
said controller using the identified STO oscillation to ensure stable MAMR HDD write operation.

7. The apparatus as recited in claim 6 includes control code stored on a non-transitory computer readable medium, and wherein said controller uses said control code to identify STO oscillation, used to ensure stable MAMR HDD write operation.

8. The apparatus as recited in claim 6 includes a Read/Write integrated circuit (IC) coupled to a slider, said slider containing said spin-torque oscillator (STO); and said spin-torque oscillator (STO) oscillation checker provided in said Read/Write integrated circuit (IC).

9. The apparatus as recited in claim 6 wherein said current source applying an amplitude modulated write coil current to the write coil coupled to the spin-torque oscillator (STO) selectively applies a pulsed constant frequency write coil current to the write coil coupled to the spin-torque oscillator (STO).

10. The apparatus as recited in claim 6 wherein said current source applying an amplitude modulated write coil current to the write coil coupled to the spin-torque oscillator (STO)) selectively applies a pulsed fixed amplitude alternating frequency write coil current to the write coil coupled to the spin-torque oscillator (STO).

11. The apparatus as recited in claim 6 includes a STO bias current source applying a constant DC STO bias current to the spin-torque oscillator (STO).

12. The apparatus as recited in claim 6 includes a threshold detector coupled to an output of the amplifier circuit, said threshold detector used to identify STO resistance modulation including a sudden STO resistance step.

13. A system for implementing a spin-torque oscillator (STO) oscillation checker comprising:
a microwave assisted magnetic recording (MAMR) hard disk drive (HDD), said MAMR HDD comprising a controller;
at least one disk; said disk including a disk media for storing data;
a spin-torque oscillator (STO) for microwave assisted magnetic recording (MAMR);
a write coil coupled to said spin-torque oscillator (STO);
a Read/Write integrated circuit (IC) coupled to a slider, said slider containing said spin-torque oscillator (STO); and said Read/Write integrated circuit (IC) implementing the spin-torque oscillator (STO) oscillation checker;
the spin-torque oscillator (STO) oscillation checker comprising
a current source applying an amplitude modulated write coil current to the write coil coupled to a spin-torque oscillator (STO);
an amplifier circuit coupled to the STO, monitoring STO voltage responsive to the applied amplitude modulated write coil current to identify STO resistance modulation, and using said identified STO resistance modulation to identify STO oscillation; and
said controller using the identified STO oscillation to ensure stable MAMR HDD write operation.

14. The system as recited in claim 13 includes control code stored on a non-transitory computer readable medium, and wherein said controller uses said control code to identify STO oscillation during MAMR HDD operation.

15. The system as recited in claim 13 includes a STO bias current source applying a constant DC STO bias current to the spin-torque oscillator (STO).

16. The system as recited in claim 13 wherein said current source applying an amplitude modulated write coil current to the write coil coupled to the spin-torque oscillator (STO) applies a constant frequency write coil current to the write coil coupled to the spin-torque oscillator (STO) at power-on and periodically during MAMR HDD operation.

17. The system as recited in claim 13 wherein said current source applying an amplitude modulated write coil to the write coil coupled to the spin-torque oscillator (STO) selectively applies a pulsed fixed amplitude alternating frequency write coil current to the write coil coupled to the spin-torque oscillator (STO) at power-on and periodically during MAMR HDD operation.

\* \* \* \* \*